US012697966B2

(12) United States Patent　　　(10) Patent No.:　US 12,697,966 B2

Philbin et al.　　　(45) Date of Patent:　　Aug. 4, 2026

(54) END-TO-END PROCESSING IN AUTOMATED DRIVING SYSTEMS

(71) Applicant: Waymo LLC, Mountain View, CA (US)

(72) Inventors: James Philbin, Palo Alto, CA (US); Vasiliy Igorevich Karasev, San Francisco, CA (US); Alper Ayvaci, San Jose, CA (US); Marc Wimmershoff, Redwood City, CA (US); Dragomir Dimitrov Anguelov, San Carlos, CA (US)

(73) Assignee: Waymo LLC, Mountain View, CA (US)

( * ) Notice: Subject to any disclaimer, the term of this patent is extended or adjusted under 35 U.S.C. 154(b) by 159 days.

(21) Appl. No.: 18/169,105

(22) Filed: Feb. 14, 2023

(65) Prior Publication Data

US 2023/0294687 A1　　Sep. 21, 2023

Related U.S. Application Data

(60) Provisional application No. 63/310,457, filed on Feb. 15, 2022.

(51) Int. Cl.
B60W 30/095　　(2012.01)
G05B 13/02　　(2006.01)

(52) U.S. Cl.
CPC ....... B60W 30/0956 (2013.01); G05B 13/027 (2013.01); B60W 2420/403 (2013.01);
(Continued)

(58) Field of Classification Search
CPC ....... B60W 30/0956; B60W 2420/403; B60W 2420/408; B60W 2554/4044;
(Continued)

(56) References Cited

U.S. PATENT DOCUMENTS 11,151,447 B1 * 10/2021 Chen ..................... G01S 7/4091
11,494,937 B2 * 11/2022 Urtasun ................ G06N 3/084
(Continued)

FOREIGN PATENT DOCUMENTS

CN　　112668437 A　*　4/2021
EP　　3926360 A1　12/2021
(Continued)

OTHER PUBLICATIONS

R. Theodose et al., "R-AGNO-RPN: A LIDAR-Camera Region Proposal Deep Network for Resolution-Agnostic Object Detection", Dec. 10, 2020, Sherpa Engineering R&D Department, pp. 1-15 (Year: 2020).*

(Continued)

*Primary Examiner* — Erin M Piateski
*Assistant Examiner* — Ashley Tiffany Schoech
(74) *Attorney, Agent, or Firm* — Lowenstein Sandler LLP

(57) ABSTRACT

The described aspects and implementations enable efficient object detection and tracking. In one implementation, disclosed is a method and a system to perform the method, the system including the sensing system configured to obtain sensing data characterizing an environment of the vehicle. The system further includes a data processing system operatively coupled to the sensing system and configured to process the sensing data using a first (second) set of neural network (NN) layers to obtain a first (second) set of features for a first (second) region of the environment, the first (second) set of features is associated with a first (second) spatial resolution. The data processing system is further to process the two sets of features using a second set of NN layers to detect a location of object(s) in the environment of the vehicle and a state of motion of the object(s).

20 Claims, 6 Drawing Sheets

(52) U.S. Cl.
CPC ................. *B60W 2420/408* (2024.01); *B60W 2554/4044* (2020.02); *B60W 2555/60* (2020.02); *B60W 2556/40* (2020.02)

(58) Field of Classification Search
CPC .......... B60W 2555/60; B60W 2556/40; B60R 2300/301; B60R 2300/302; G05B 13/027; G01S 13/584; G01S 13/931; G01S 13/867

See application file for complete search history.

(56) References Cited

U.S. PATENT DOCUMENTS

| | | | | |
|---|---|---|---|---|
| 11,734,848 | B2 * | 8/2023 | Springer | G01S 17/42 |
| | | | | 701/28 |
| 2018/0232947 | A1 * | 8/2018 | Nehmadi | G01S 7/295 |
| 2019/0383627 | A1 * | 12/2019 | Nangeroni | B60W 50/0098 |
| 2020/0081134 | A1 * | 3/2020 | Wheeler | G01S 19/396 |
| 2020/0160559 | A1 | 5/2020 | Urtasun | |
| 2021/0026355 | A1 | 1/2021 | Chen et al. | |
| 2021/0110557 | A1 | 4/2021 | Busey | |
| 2021/0192689 | A1 | 6/2021 | Bosse et al. | |
| 2022/0035376 | A1 * | 2/2022 | Laddah | G05D 1/247 |
| 2022/0036650 | A1 | 2/2022 | Gomez et al. | |
| 2022/0044107 | A1 * | 2/2022 | Kale | G06F 3/0679 |
| 2022/0156576 | A1 * | 5/2022 | Rasouli | G06V 10/25 |
| 2022/0165052 | A1 | 5/2022 | Gan et al. | |
| 2022/0207275 | A1 * | 6/2022 | Parikh | B60W 30/0956 |
| 2022/0309672 | A1 | 9/2022 | Cherian et al. | |
| 2023/0104843 | A1 * | 4/2023 | Yang | G06N 3/084 |
| | | | | 706/20 |
| 2023/0144543 | A1 * | 5/2023 | Dake | G01S 17/89 |
| | | | | 701/450 |
| 2023/0206393 | A1 | 6/2023 | Hutchcroft et al. | |

FOREIGN PATENT DOCUMENTS

| | | | | | |
|---|---|---|---|---|---|
| JP | | 2020013480 | A | 1/2020 | |
| JP | | 2021089723 | A | 6/2021 | |
| WO | WO-2018225071 | A1 * | 12/2018 | .......... | B60W 60/001 |
| WO | | 2020233755 | A1 | 11/2020 | |

OTHER PUBLICATIONS

Cody, R., et al., "Categorical Depth Distribution Network for Monocular 3D Object Detection," 2021 IEEE/CVF Conference on Computer Vision and Pattern Recognition (CVPR), Jun. 2021, pp. 8551-8560, XP034010083, DOI: 10.1109/CVPR46437.2021.00845.

Huang et al., "BEVDet4D: Exploit Temporal Cues in Multi-camera 3D Object Detection," Jun. 2022, 11 pages, XP091248196.

International Search Report and Written Opinion for International Application No. PCT/US2023/013055, mailed May 2, 2023, 15 Pages.

International Search Report and Written Opinion for International Application No. PCT/US2023/029667, mailed Oct. 11, 2023, 15 Pages.

Kim J., et al., "Low-Level Sensor Fusion for 3D Vehicle Detection Using Radar Range-Azimuth Heatmap and Monocular Image," 16th European Conference on Computer Vision—ECCV 2020, Feb. 25, 2021, pp. 388-402, (Section 2, 4, and 5; figures 3, 5, 6; table 2), XP047577720.

Li et al., "BEVDepth: Acquisition of Reliable Depth for Multi-view 3D Object Detection," Jun. 2022, 12 pages, XP091254736.

Philion et al.,"Lift, Splat, Shoot: Encoding Images From Arbitrary Camera Rigs by Implicitly Unprojecting to 3D," Aug. 2020, 17 pages, XP081739891.

International Search Report and Written Opinion for Application No. PCT/US2023/013161, Jun. 16, 2023, 15 pages.

Hu et al, "FIERY: Future Instance Prediction in Bird's-Eye View from Surround Monocular Cameras," arxiv.org, Cornell University Library, Oct. 18, 2021, 16 pages.

Morales N., et al., "A Combined Voxel and Particle Filter-Based Approach for Fast Obstacle Detection and Tracking in Automotive Applications," IEEE, Jul. 2017, vol. 18 (7), pp. 1824-1834.

Office Action for Canadian Patent Application No. 3252364, mailed Aug. 21, 2025, 3 Pages.

Office Action for European Patent Application No. 23710561.4, mailed Sep. 9, 2025, 5 Pages.

Office Action for Japanese Patent Application No. 2025506943, mailed Dec. 11, 2025, 06 Pages.

* cited by examiner

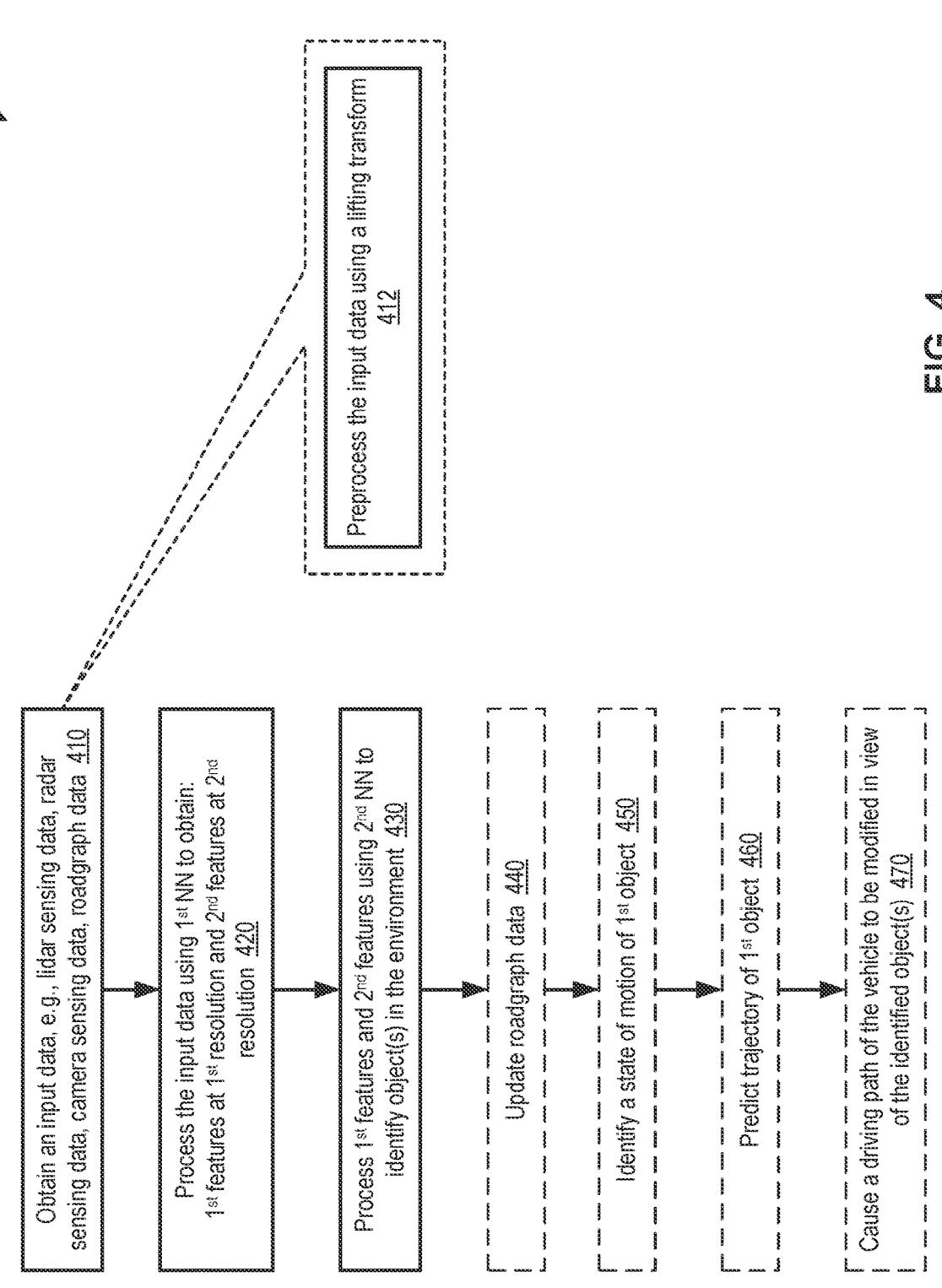

400

Obtain an input data, e.g., lidar sensing data, radar sensing data, camera sensing data, roadgraph data 410

Process the input data using 1st NN to obtain: 1st features at 1st resolution and 2nd features at 2nd resolution 420

Process 1st features and 2nd features using 2nd NN to identify object(s) in the environment 430

Update roadgraph data 440

Identify a state of motion of 1st object 450

Predict trajectory of 1st object 460

Cause a driving path of the vehicle to be modified in view of the identified object(s) 470

Preprocess the input data using a lifting transform 412

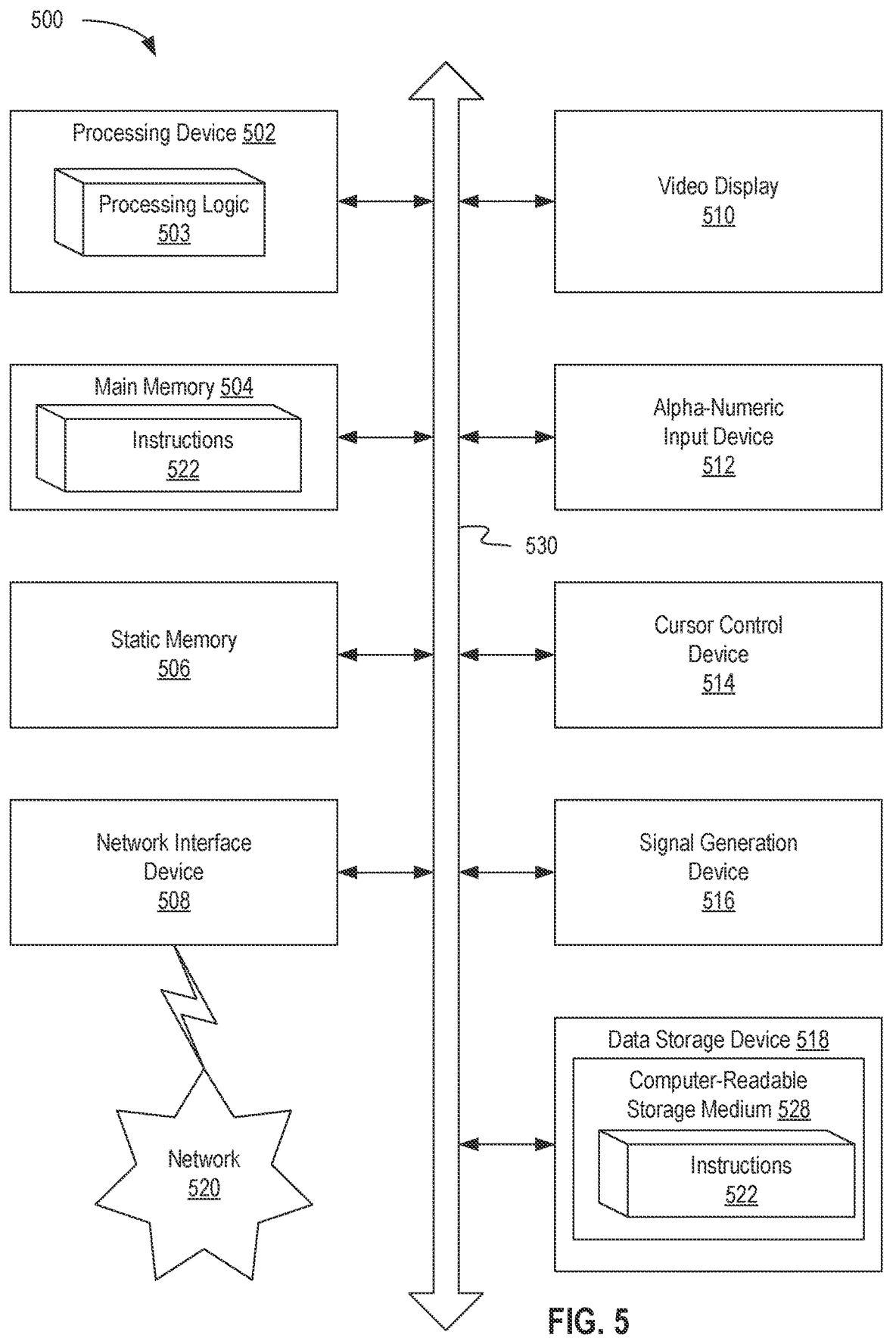

Processing Device 502

Processing Logic
503

Video Display
510

Main Memory 504

Instructions
522

Alpha-Numeric
Input Device
512

530

Static Memory
506

Cursor Control
Device
514

Network Interface
Device
508

Signal Generation
Device
516

Network
520

Data Storage Device 518

Computer-Readable
Storage Medium 528

Instructions
522

FIG. 5

END-TO-END PROCESSING IN AUTOMATED DRIVING SYSTEMS

TECHNICAL FIELD

The instant specification generally relates to autonomous vehicles and vehicles deploying driver assistance systems. More specifically, the instant specification relates to improving autonomous driving systems and driver assistance systems using machine learning for end-to-end detection of objects encountered in driving environments, predicting behavior of the detected objects, and planning a driving trajectory of vehicles.

BACKGROUND

An autonomous (fully or partially self-driving) vehicle operates by sensing an outside environment with various electromagnetic (e.g., radar and optical) and non-electromagnetic (e.g., audio and humidity) sensors. Some autonomous vehicles chart a driving path through the environment based on the sensed data. The driving path can be determined based on Global Navigation Satellite System (GNSS) data and road map data. While the GNSS and the road map data can provide information about static aspects of the environment (buildings, street layouts, road closures, etc.), dynamic information (such as information about other vehicles, pedestrians, street lights, etc.) is obtained from contemporaneously collected sensing data. Precision and safety of the driving path and of the speed regime selected by the autonomous vehicle depend on timely and accurate identification of various objects present in the driving environment and on the ability of a driving algorithm to process the information about the environment and to provide correct instructions to the vehicle controls and the drivetrain.

BRIEF DESCRIPTION OF THE DRAWINGS

The present disclosure is illustrated by way of examples, and not by way of limitation, and can be more fully understood with references to the following detailed description when considered in connection with the figures, in which:

FIG. 4 illustrates an example method of end-to-end processing that uses multiscale representations of an environment of a vehicle for efficient detection of objects, in accordance with some implementations of the present disclosure.

FIG. 5 depicts a block diagram of an example computer device capable of enabling end-to-end perception models that can be deployed as part of a perception system of a vehicle, in accordance with some implementations of the present disclosure.

DETAILED DESCRIPTION

Figure 1:
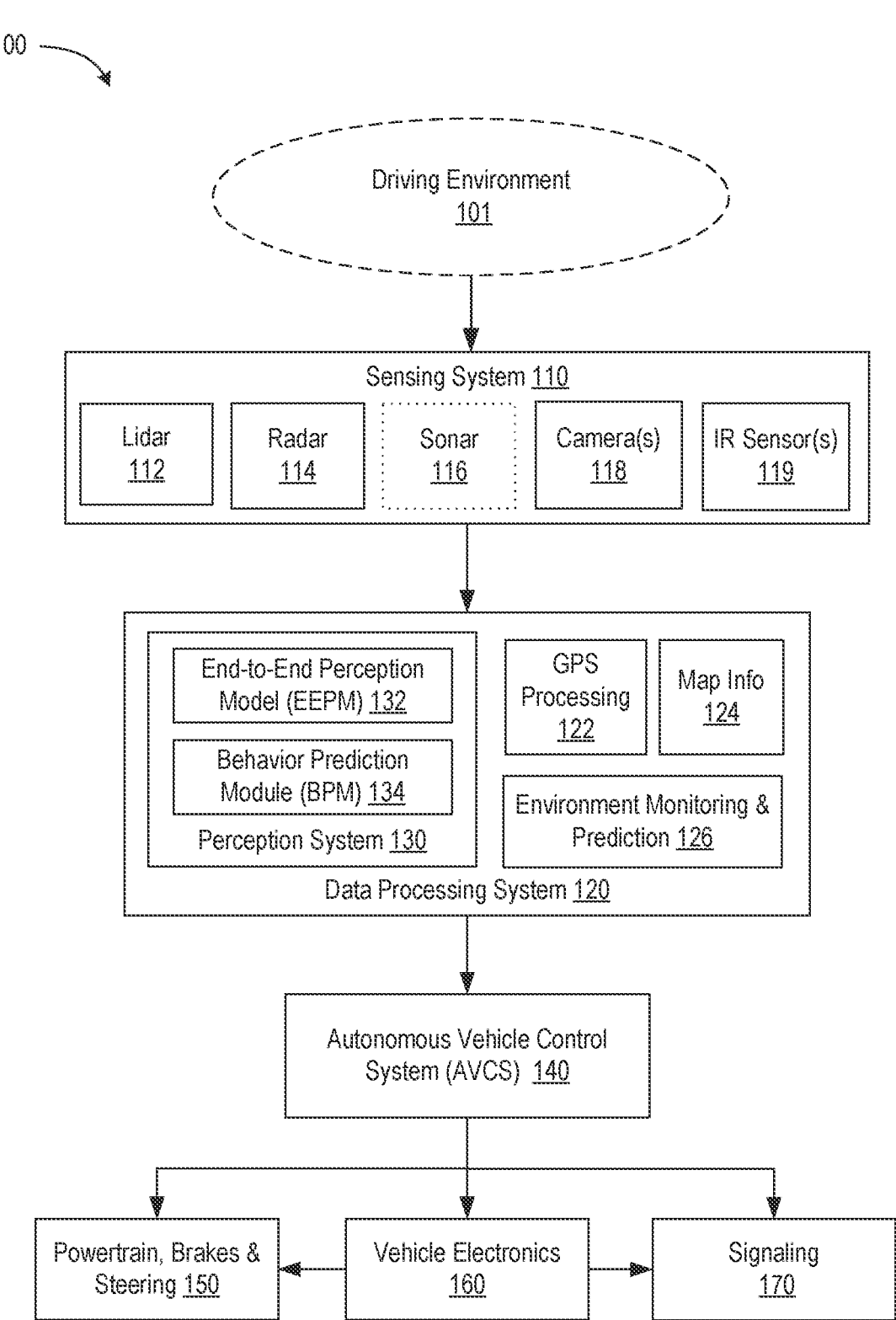
FIG. 1 is a diagram illustrating components of an example vehicle capable of deploying end-to-end perception models, in accordance with some implementations of the present disclosure.

For the safety of operations of driver-assistance systems and autonomous driving systems, it is necessary to develop and deploy techniques that detect various objects, such as vehicles, pedestrians, construction equipment, domestic and wild animals, etc., and predict behavior of the detected objects within a certain time horizon. Additionally, perception systems need to be able to identify special driving environments that require increased perception and prediction capabilities such as intersections, detours, construction zones, accidents, emergency vehicles, and the like. Modern automotive perception systems typically have highly structured architectures consisting of a number of large and small models, each model uses specific algorithms and heuristics, separately developed and trained. Each model in the stack of models is usually designed to solve a single task or a particular limited set of tasks, such as vehicle detection, pedestrian classification, vehicle light classification, and the like. Such an architecture can perform well under specific conditions and operational design domains for which the stack of models has been designed.

Despite substantial progress, the existing architectures have significant disadvantages. The existing designs rely heavily on lidar data. Lidars provide a detailed three-dimensional view of the environment but are expensive devices that require significant maintenance and highly efficient computational support. The quality of lidar data can be negatively affected by weather conditions, low visibility, external objects (e.g., dust, ice, moisture or road spray, etc.) obscuring optical interfaces, and other factors. Overreliance on lidar data can, therefore, lead to missed objects, falsely detected objects, objects whose locations are detected with a substantial error, and so on. Cross-leveraging other data modalities (e.g., camera data, radar data, etc.) may be difficult when lidar (or other sensors) underperform as specific models of the perception stack are often heavily reliant on a particular (e.g., lidar) data modality.

Additional shortcomings of the existing architecture are related to the large number of models which have to be run simultaneously, often using the same or similar input data, which leads to many inefficiencies in utilization of graphics processing units (GPUs) and/or tensor processing units (TPUs) that perform model computations and result in a significant scheduling/memory overhead. The large number of models makes it difficult to take advantage of a shared feature space. Improvements in an architecture for a specific model are not easily transferable to other models and often require additional resources in retraining time and cost.

Aspects and implementations of the present disclosure address these and other shortcomings of the existing perception technology by enabling methods and systems that leverage different sensing modalities using a perception stack architecture that takes advantage of the combined feature space for different data streams. Each data stream is first processed by a respective modality network (e.g., camera stream is first processed by a camera network) to produce features for various regions of space (represented as voxels by the perception system). Feature vectors produced for different sensing modalities are then combined for each voxel of space. The combined feature vectors are further processed by a backbone network that feeds intermediate outputs to a number of classifier heads that determine classes for various voxels. The output classes can indicate whether voxels are occupied, the type of the objects that occupy the voxels, whether objects are occluded with other objects, motion of objects between different voxel regions, and so on. In some implementations, combined feature vectors can be defined for multiple grids that differ by resolution (voxel sizes), referred herein to as the bird's-eye-view (BEV) grid.

This end-to-end perception model (EEPM) can be trained using sensor dropout that includes training scenarios where some of the sensors, e.g., some of the cameras and/or radars are removed, e.g., a right-side facing camera is removed and the information about the objects in the portion of space covered by the removed camera is provided by other sensing modalities (e.g., lidar and/or radar sensors). Training scenarios can also include a complete dropout of a particular sensing modality, e.g., dropout of lidar data feed, such that all information about the environment is provided by cameras and radars. This trains the output of EEPM to be robust against failure of individual sensors and entire sensing modalities. Depending on computational complexity and sophistication of training, EEPM can be used in various levels of driving automation, including Level 2 driving assistance systems, Level 3 contextual autonomous driving, Level 4 predominantly autonomous driving, Level 5 fully autonomous driving, and other implementations.

Advantages of the described implementations include sensing complementarity across different modalities as well as better leveraging low-cost modalities, such as cameras and/or radars, which significantly improves camera only or camera+radar modalities. The EEPM design improves both the robustness of the perception output and the memory CPU/GPU/TPU utilization predicated on reduced amount of scheduling and pagination to support fewer models and instances of loading/unloading of data. The EEPM design allows more scaling flexibility to available computational platforms (e.g., use of EfficientNet-b1 backbones vs b7, and so on). Furthermore, the EEPM design allows flexible training and combining perception with prediction functionalities.

FIG. 1 is a diagram illustrating components of an example vehicle 100 capable of deploying end-to-end perception models, in accordance with some implementations of the present disclosure. Vehicle 100 can be a driver-operated vehicle that deploys one or more driver assistance systems or an autonomous vehicle. Autonomous vehicles can include motor vehicles (cars, trucks, buses, motorcycles, all-terrain vehicles, recreational vehicles, any specialized farming or construction vehicles, and the like), aircraft (planes, helicopters, drones, and the like), naval vehicles (ships, boats, yachts, submarines, and the like), spacecraft (controllable objects operating outside Earth atmosphere) or any other self-propelled vehicles (e.g., robots, factory or warehouse robotic vehicles, sidewalk delivery robotic vehicles, etc.) capable of being operated in a self-driving mode (without a human input or with a reduced human input).

Vehicles, such as those described herein, may be configured to operate in one or more different driving modes. For instance, in a manual driving mode, a driver may directly control acceleration, deceleration, and steering via inputs such as an accelerator pedal, a brake pedal, a steering wheel, etc. A vehicle may also operate in one or more autonomous driving modes including, for example, a semi or partially autonomous driving mode in which a person exercises some amount of direct or remote control over driving operations, or a fully autonomous driving mode in which the vehicle handles the driving operations without direct or remote control by a person. These vehicles may be known by different names including, for example, autonomously driven vehicles, self-driving vehicles, and so on.

As described herein, in a semi-autonomous or partially autonomous driving mode, even though the vehicle assists with one or more driving operations (e.g., steering, braking and/or accelerating to perform lane centering, adaptive cruise control, advanced driver assistance systems (ADAS), or emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

Although, for brevity and conciseness, various systems and methods may be described below in conjunction with autonomous vehicles, similar techniques can be used in various driver assistance systems that do not rise to the level of fully autonomous driving systems. In the United States, the Society of Automotive Engineers (SAE) have defined different levels of automated driving operations to indicate how much, or how little, a vehicle controls the driving, although different organizations, in the United States or in other countries, may categorize the levels differently. More specifically, disclosed systems and methods can be used in SAE Level 2 (L2) driver assistance systems that implement steering, braking, acceleration, lane centering, adaptive cruise control, etc., as well as other driver support. The disclosed systems and methods can be used in SAE Level 3 (L3) driving assistance systems capable of autonomous driving under limited (e.g., highway) conditions. Likewise, the disclosed systems and methods can be used in vehicles that use SAE Level 4 (L4) self-driving systems that operate autonomously under most regular driving situations and require only occasional attention of the human operator. In all such driving assistance systems, accurate lane estimation can be performed automatically without a driver input or control (e.g., while the vehicle is in motion) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

A driving environment 101 can include any objects (animate or inanimate) located outside the vehicle, such as roadways, buildings, trees, bushes, sidewalks, bridges, mountains, other vehicles, pedestrians, piers, banks, landing strips, animals, birds, and so on. The driving environment 101 can be urban, suburban, rural, and so on. In some implementations, the driving environment 101 can be an off-road environment (e.g. farming or other agricultural land). In some implementations, the driving environment can be an indoor environment, e.g., the environment of an industrial plant, a shipping warehouse, a hazardous area of a building, and so on. In some implementations, the driving environment 101 can be substantially flat, with various objects moving parallel to a surface (e.g., parallel to the surface of Earth). In other implementations, the driving environment can be three-dimensional and can include objects that are capable of moving along all three directions (e.g., balloons, falling leaves, etc.). Hereinafter, the term "driving environment" should be understood to include all environments in which an autonomous motion (e.g., SAE Level 5 (L5) and L4 systems), conditional autonomous motion (e.g., L3 systems), and/or motion of vehicles equipped with driver assistance technology (e.g., L2 systems) can occur. Additionally, "driving environment" can include any possible flying environment of an aircraft (or spacecraft) or a marine environment of a naval vessel. The objects of the driving environment 101 can be located at any distance from the vehicle, from close distances of several feet (or less) to several miles (or more).

The example vehicle 100 can include a sensing system 110. The sensing system 110 can include various electromagnetic (e.g., optical, infrared, radio wave, etc.) and non-electromagnetic (e.g., acoustic) sensing subsystems and/or devices. The sensing system 110 can include one or more lidars 112, which can be a laser-based unit capable of determining distances to the objects and velocities of the objects in the driving environment 101. The sensing system 110 can include one or more radars 114, which can be any system that utilizes radio or microwave frequency signals to sense objects within the driving environment 101 of the vehicle 100. The lidar(s) 112 and or radar(s) 114 can be configured to sense both the spatial locations of the objects (including their spatial dimensions) and velocities of the objects (e.g., using the Doppler shift technology). Hereinafter, "velocity" refers to both how fast the object is moving (the speed of the object) as well as the direction of the object's motion. Each of the lidar(s) 112 and radar(s) 114 can include a coherent sensor, such as a frequency-modulated continuous-wave (FMCW) lidar or radar sensor. For example, lidar(s) 112 and/or radar(s) 114 can use heterodyne detection for velocity determination. In some implementations, the functionality of a ToF and coherent lidar (or radar) is combined into a lidar (or radar) unit capable of simultaneously determining both the distance to and the radial velocity of the reflecting object. Such a unit can be configured to operate in an incoherent sensing mode (ToF mode) and/or a coherent sensing mode (e.g., a mode that uses heterodyne detection) or both modes at the same time. In some implementations, multiple lidars 112 and/or radar 114s can be mounted on vehicle 100.

Lidar 112 (and/or radar 114) can include one or more optical sources (and/or radio/microwave sources) producing and emitting signals and one or more detectors of the signals reflected back from the objects. In some implementations, lidar 112 and/or radar 114 can perform a 360-degree scanning in a horizontal direction. In some implementations, lidar 112 and/or radar 114 can be capable of spatial scanning along both the horizontal and vertical directions. In some implementations, the field of view can be up to 90 degrees in the vertical direction (e.g., with at least a part of the region above the horizon being scanned with lidar or radar signals). In some implementations (e.g., aerospace applications), the field of view can be a full sphere (consisting of two hemispheres).

The sensing system 110 can further include one or more cameras 118 to capture images of the driving environment 101. Cameras 118 can operate in the visible part of the electromagnetic spectrum, e.g., 300-800 nm range of wavelengths (herein also referred for brevity as the optical range). Some of the optical range cameras 118 can use a global shutter while other cameras 118 can use a rolling shutter. The images can be two-dimensional projections of the driving environment 101 (or parts of the driving environment 101) onto a projecting surface (flat or non-flat) of the camera(s). Some of the cameras 118 of the sensing system 110 can be video cameras configured to capture a continuous (or quasi-continuous) stream of images of the driving environment

101. The sensing system 110 can also include one or more sonars 116, for active sound probing of the driving environment 101, e.g., ultrasonic sonars, and one or more microphones for passive listening to the sounds of the driving environment 101. The sensing system 110 can also include one or more infrared range cameras 119 also referred herein as IR cameras 119. IR camera(s) 119 can use focusing optics (e.g., made of germanium-based materials, silicon-based materials, etc.) that is configured to operate in the range of wavelengths from microns to tens of microns or beyond. IR camera(s) 119 can include a phased array of IR detector elements. Pixels of IR images produced by camera(s) 119 can be representative of the total amount of IR radiation collected by a respective detector element (associated with the pixel), of the temperature of a physical object whose IR radiation is being collected by the respective detector element, or any other suitable physical quantity.

The sensing data obtained by the sensing system 110 can be processed by a data processing system 120 of vehicle 100. For example, the data processing system 120 can include a perception system 130. The perception system 130 can be configured to detect and track objects in the driving environment 101 and to recognize the detected objects. For example, the perception system 130 can analyze images captured by the cameras 118 and can be capable of detecting traffic light signals, road signs, roadway layouts (e.g., boundaries of traffic lanes, topologies of intersections, designations of parking places, and so on), presence of obstacles, and the like. The perception system 130 can further receive radar sensing data (Doppler data and ToF data) to determine distances to various objects in the environment 101 and velocities (radial and, in some implementations, transverse, as described below) of such objects. In some implementations, the perception system 130 can use radar data in combination with the data captured by the camera(s) 118, as described in more detail below.

The perception system 130 can include one or more components to facilitate detection, classification, and tracking of objects, including an end-to-end perception model (EEPM) 132 that can be used to process data provided by the sensing system 110. More specifically, in some implementations, EEPM 132 can receive data from sensors of different sensing modalities. For example, EEPM 132 can receive images from at least some of lidar(s) 112, radar(s) 114, and (optical range) camera(s) 118, IR camera(s) 119, sonar(s) 116 and the like. In particular, EEPM 132 can include one or more trained machine-learning models (MLMs) that are used to process some or all of the above data to detect, classify, and track motion of various objects in the outside environment. EEPM 132 can use multiple classifier heads to determine various properties of the outside environment, including but not limited to occupation of space with various objects, types of the objects, motion of the objects, identification of objects that can be occluded, relation of the objects to the roadway, to other objects, and to the traffic flow. Various models of EEPM 132 can be trained using multiple sets of images/data, annotated to identify specific features in the respective sensing data. In some implementations, the perception system 130 can include a behavior prediction module (BPM) 134 that predicts future motion of the detected objects.

The perception system 130 can further receive information from a Global Navigation Satellite System (GNSS) positioning subsystem (not shown in FIG. 1), which can include a GNNS transceiver (not shown), configured to obtain information about the position of the vehicle relative to Earth and its surroundings. The positioning subsystem can use the positioning data (e.g., GNNS and inertial measurement unit (IMU) data) in conjunction with the sensing data to help accurately determine the location of the vehicle with respect to fixed objects of the driving environment 101 (e.g. roadways, lane boundaries, intersections, sidewalks, crosswalks, road signs, curbs, surrounding buildings, etc.) whose locations can be provided by map information 124. In some implementations, the data processing system 120 can receive non-electromagnetic data, such as audio data (e.g., ultrasonic sensor data from sonar 116 or data from microphone picking up emergency vehicle sirens), temperature sensor data, humidity sensor data, pressure sensor data, meteorological data (e.g., wind speed and direction, precipitation data), and the like.

The data processing system 120 can further include an environment monitoring and prediction component 126, which can monitor how the driving environment 101 evolves with time, e.g., by keeping track of the locations and velocities of the animated objects (e.g., relative to Earth). In some implementations, the environment monitoring and prediction component 126 can keep track of the changing appearance of the environment due to a motion of the vehicle relative to the environment. In some implementations, the environment monitoring and prediction component 126 can make predictions about how various animated objects of the driving environment 101 will be positioned within a prediction time horizon. The predictions can be based on the current state of the animated objects, including current locations (coordinates) and velocities of the animated objects. Additionally, the predictions can be based on a history of motion (tracked dynamics) of the animated objects during a certain period of time that precedes the current moment. For example, based on stored data for a first object indicating accelerated motion of the first object during the previous 3-second period of time, the environment monitoring and prediction component 126 can conclude that the first object is resuming its motion from a stop sign or a red traffic light signal. Accordingly, the environment monitoring and prediction component 126 can predict, given the layout of the roadway and presence of other vehicles, where the first object is likely to be within the next 3 or 5 seconds of motion. As another example, based on stored data for a second object indicating decelerated motion of the second object during the previous 2-second period of time, the environment monitoring and prediction component 126 can conclude that the second object is stopping at a stop sign or at a red traffic light signal. Accordingly, the environment monitoring and prediction component 126 can predict where the second object is likely to be within the next 1 or 3 seconds. The environment monitoring and prediction component 126 can perform periodic checks of the accuracy of its predictions and modify the predictions based on new data obtained from the sensing system 110. The environment monitoring and prediction component 126 can operate in conjunction with EEPM 132 and/or BPM 134. For example, the environment monitoring and prediction component 126 can track relative motion of the vehicle and various objects (e.g., reference objects that are stationary or moving relative to Earth).

The data generated by the perception system 130, the GNSS processing module 122, and the environment monitoring and prediction component 126 can be used by an autonomous driving system, such as autonomous vehicle control system (AVCS) 140. The AVCS 140 can include one or more algorithms that control how a vehicle is to behave in various driving situations and environments. For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions, rocks, stalled vehicles, pedestrians, animals, and the like, within the driving environment of the vehicle. The obstacle avoidance system can be configured to evaluate the size and motion pattern of the obstacles and select an optimal driving strategy (e.g., braking, steering, accelerating, etc.) for avoiding the obstacles.

Algorithms and modules of AVCS 140 can generate instructions for various systems and components of the vehicle, such as the powertrain, brakes, and steering 150, vehicle electronics 160, signaling 170, and other systems and components not explicitly shown in FIG. 1. The powertrain, brakes, and steering 150 can include an engine (internal combustion engine, electric engine, and so on), transmission, differentials, axles, wheels, steering mechanism, and other systems. The vehicle electronics 160 can include an on-board computer, engine management, ignition, communication systems, carputers, telematics, in-car entertainment systems, and other systems and components. The signaling 170 can include high and low headlights, stopping lights, turning and backing lights, horns and alarms, inside lighting system, dashboard notification system, passenger notification system, radio and wireless network transmission systems, and so on. Some of the instructions output by the AVCS 140 can be delivered directly to the powertrain, brakes, and steering 150 (or signaling 170) whereas other instructions output by the AVCS 140 are first delivered to the vehicle electronics 160, which generates commands to the powertrain, brakes, and steering 150 and/or signaling 170.

In one example, BPM 134 can determine that one of the objects being tracked by EEPM 132 is about to change lanes and move over to the lane occupied by vehicle 100. Responsive to this determination, the data processing system 120 can determine that the vehicle needs to slow down until a safe speed is reached. The AVCS 140 can output instructions to the powertrain, brakes, and steering 150 (directly or via the vehicle electronics 160) to: (1) reduce, by modifying the throttle settings, a flow of fuel to the engine to decrease the engine rpm; (2) downshift, via an automatic transmission, the drivetrain into a lower gear; and (3) engage a brake unit to reduce (while acting in concert with the engine and the transmission) the vehicle's speed until the safe speed is reached that permits the object to change lanes safely and move in front of vehicle 100. Subsequently, after the object has moved away, the AVCS 140 can output instructions to the powertrain, brakes, and steering 150 to resume the previous speed settings of the vehicle.

Figure 2:
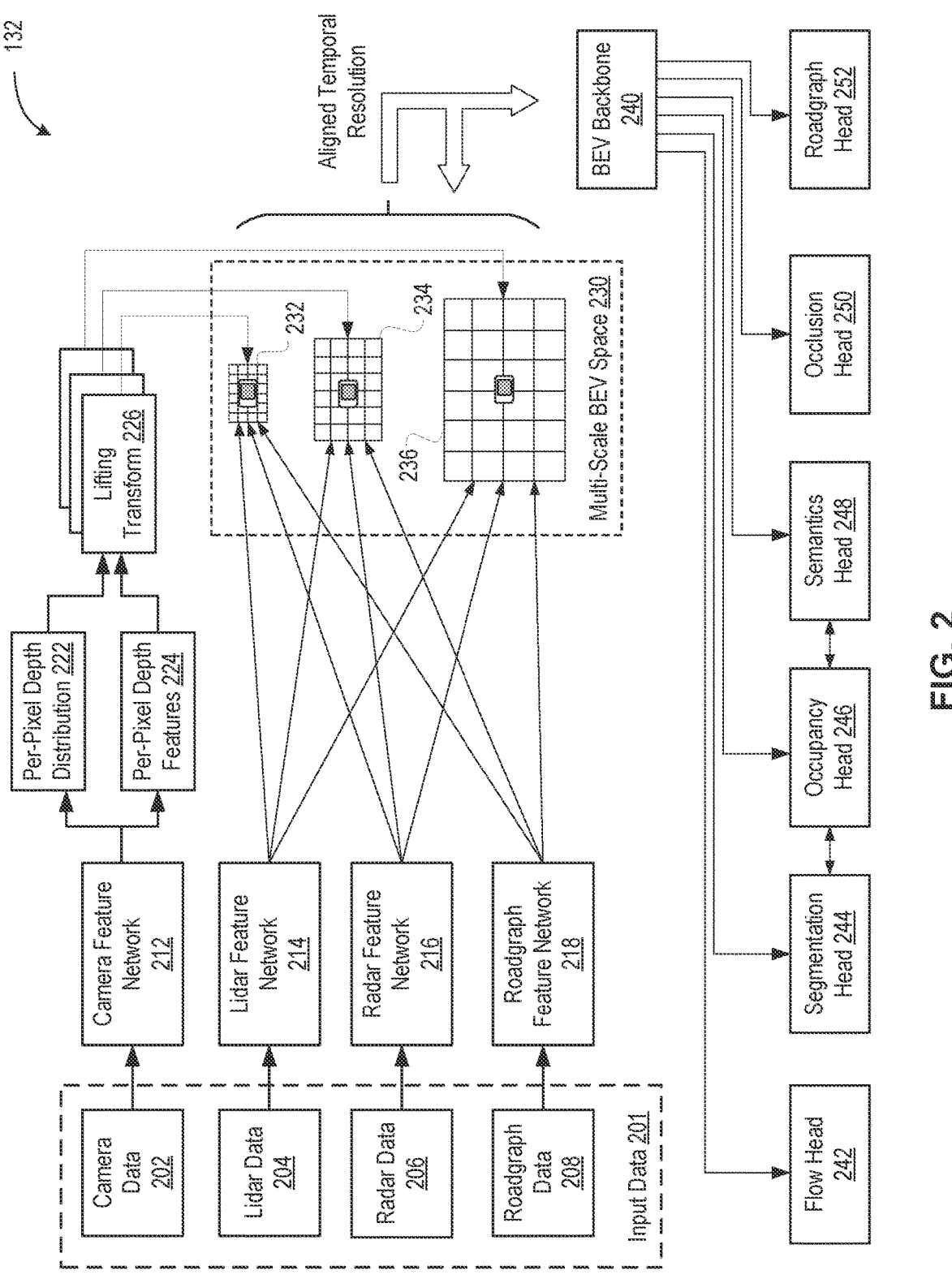
FIG. 2 is a diagram illustrating example network architecture of an end-to-end perception model that can be deployed as part of a perception system of a vehicle, in accordance with some implementations of the present disclosure.

FIG. 2 is a diagram illustrating example network architecture of an end-to-end perception model 132 that can be deployed as part of a perception system of a vehicle, in accordance with some implementations of the present disclosure. An input data 201 into EEPM 132 can include data obtained by various components of the sensing system 110 (as depicted in FIG. 1), e.g., lidar(s) 112, radar(s) 114, optical (e.g., visible) range camera(s) 118, IR camera(s) 119. The data output by the sensors can include directional data (e.g., angular coordinates of return points), distance data, and radial velocity data, e.g., as can be obtained by lidar(s) 112 and/or radar(s) 114. The data output by sensing system 110 and used as input data 201 can include any, some, or all of the following sensing modalities: camera data 202, lidar data 204, radar data 206. Additionally, input into EEPM 132 can include roadgraph data 208 stored by (or accessible to) perception system 130, e.g., as part of map information 124. It should be understood that this list of input data 201 is not exhaustive and any suitable additional data can be used as part of input data 201, e.g., IMU data, GNNS data, and the like. Each of the modalities of input data 201 can be associated with a specific instance of time when the data was acquired. A set of all available data (e.g., a lidar image, a radar image, a camera image, and/or an IR camera image, etc.) associated with a specific instance of time can be referred to as a sensing frame. In some implementations, the images obtained by different sensors can be synchronized, so that all images in a given sensing frame have the same (up to an accuracy of synchronization) timestamp. In some implementations, some images in a given sensing frame can have (controlled) time offsets.

An image obtained by any of sensors can include a corresponding intensity map $I(\{x_j\})$ where $\{x_j\}$ can be any set of coordinates, including three-dimensional (spherical, cylindrical, Cartesian, etc.) coordinates (e.g., in the instances of lidar and/or radar images), or two-dimensional coordinates (in the instances of camera data). Coordinates of various objects (or surfaces of the objects) that reflect lidar and/or radar signals can be determined from directional data (e.g., polar $\theta$ and azimuthal $\phi$ angles in the direction of lidar/radar transmission) and distance data (e.g., radial distance R determined from the ToF of lidar/radar signals). The intensity map can identify intensity of sensing signals detected by the corresponding sensors. Similarly, lidar and/or radar sensors can produce Doppler (frequency shift) map, $\Delta f(\{x_j\}$ that identifies radial velocity of reflecting objects based on detected Doppler shift $\Delta f$ of the frequency of the reflected radar signals, $V=\lambda\Delta f/2$, where $\lambda$ is the lidar/radar wavelength, with positive values $\Delta f>0$ associated with objects that move towards the lidar/radar (and, therefore, the vehicle) and negative values $\Delta f<0$ associated with objects that move away from the lidar/radar. In some implementations, e.g., in driving environments where objects are moving substantially within a specific plane (e.g., ground surface), the radar intensity map and the Doppler map can be defined using two-dimensional coordinates, such as the radial distance and azimuthal angle: $I(R,\phi)$, $\Delta f(R,\phi)$.

Each sensing data modality of input data 201 can be processed using a respective feature network 212-218. More specifically, camera feature network 212 can use any suitable vision backbones, e.g. Resnet, EfficientNet, or the like. Each camera sensor (e.g., front-facing camera, rear-facing camera, etc.) can use the same backbone (same shared weights) in training to avoid learning viewpoint-specific priors to avoid having performance of EEPM 132 affected by vehicle yaws. Camera feature network 212 can output camera features (feature vectors). Each camera feature can be associated with a particular pixel or a cluster of pixels. Each pixel (or a cluster of pixels) can be associated with a depth distribution (block 222) and depth features (block 224). A lifting transform 226 may be used to 'unproject' two-dimensional (2D) features into multi-scale (multi-resolution) BEV space 230. Lifting transform 226 can take camera features from 2D backbones, sensor intrinsics and extrinsics (or derived intrinsics and extrinsics for pseudo-cameras) and make projections to the three-dimensional (3D) space. This projection can be done using various depth distribution techniques. During training, depth ground truth can be available (e.g., based on lidar data) and can be used as a structured loss. In some implementations, output of camera feature network 212 (e.g., 2D camera features) can be downsampled for computational efficiency. In some implementations, pseudo-cameras can be used. Pseudo-cameras represent crops of the images from the full resolution images to provide finer detail for long-range tasks. The pseudo-cameras can have a fixed crop or a crop that is driven from an output of the coarse resolution backbone. In some implementations, the crops can be trained directly. In some implementations, differentiable cropping can be used to train the attention mechanism end-to-end. Output of other sensors that provide 2D images (e.g., IR cameras) can be processed using the same (or similar) architecture.

Lidar feature network 214 can output lidar features. Similarly, radar feature network 216 can output radar features. To generate lidar/radar features, any suitable 3D network, such as PointPillars, Range Sparse Net, etc., can be used. Each lidar/radar modality (e.g., lidar intensity, second returns, Doppler shift, radar cross section) can have a different backbone and a feature generation layer. Generated lidar/radar features can be voxelized directly (at multiple resolutions) into coordinate frames of multi-scale BEV space 230. In some implementations, full periods (spins) of lidar/radar sensors can be used to obtain lidar/radar features. In some implementations, portions of lidar/radar periods can be used to obtain lidar/radar features. Processing of portions of such periods can allow EEPM 132 to react faster to new agents (e.g., vehicles, pedestrians, etc.) or sudden movements of existing agents in some cases and operate at the rate of the fastest sensor.

Roadgraph feature network 218 can process roadgraph data 208. Roadgraph data 208 can include historical (previously mapped) lanes and lane markings, road edges and medians, traffic lights and stop signs, crosswalks and speed bumps, driveways, parking lots and curb restrictions, railroad crossings, school zones, and zones inaccessible to traffic. Roadgraph features output by roadgraph feature network 218 may represent the current (updated) state of the roadgraph data. Roadgraph features can be voxelized directly (at multiple resolutions) into coordinate frames of multi-scale BEV space 230. Roadgraph data 208 can further include an elevation map (if available). Such prior data can be treated as separate modalities. Using such a framework can make it easier to incorporate new location-based data, such as a heatmap of object occurrences observed in previous runs. Roadgraph data 208 can be accumulated during previous driving missions for a particular route. In some instances, where prior data is not available, roadgraph data 208 can be limited by available map information 124 for a particular route. As with other modalities, roadgraph data 208 can be missing, and during training EEPM 132 can be forced to learn to incorporate roadgraph data 208 additively rather than rely on such data.

Multi-scale BEV space 230 can be a set of one or more 3D voxel grids defined by sizes and resolutions. Multi-scale BEV space 230 is a shared feature space that accumulates various available feature vector modalities. In some instances, a particular set of feature vectors (e.g., lidar features or roadgraph features) can be unavailable, e.g., temporarily or by design. In such instances, the respective contribution into multi-BEV space 230 can be absent with EEPM 132 processing relying on other available features (e.g., camera and/or radar features). The set of grids of multi-BEV space 230 defining the multi-BEV space can be recurrent, e.g., some proportion of the features obtained at time $t_1$ can be warped (using a differentiable warp such as a spatial transformer) and aggregated into new grids at time $t_2$ obtained together with the new features from time step $t_2$, e.g., using the smooth pose delta, i.e., a vehicle pose (position and orientation) change between time $t_1$ and time $t_2$).

Grids of multi-scale BEV space 230 can have higher resolution (smaller voxel size) at low distances and lower resolution (larger voxel size) at higher distances. In one example non-limiting implementation, three grids can be defined with different resolutions. The finest resolution grid 232 can have a size $L_1 \times L_1$ (where, e.g., $L_1=20$ meters), the medium resolution grid 234 can have a size $L_2 \times L_2$ (where, e.g., $L_2=70$ meters), and the coarsest resolution grid 2236 can have a size $L_3 \times L_3$ (where, e.g., $L_3=200$ meters). It should be understood that these values are for illustration only and the sizes of the grids can be dependent on the available computational facilities and specific driving missions, e.g., highway driving can involve grids with larger pixels (than in cases of urban driving) but extending to longer distances, proportional to the typical speeds involved.

Multi-scale BEV space 230 can be in a smooth pose consistent frame. Multi-scale BEV space 230 can be spatially consistent for a period of time used for the aggregation in detection. In some implementations, a process for clearing distant portions of the grid and shifting values over as the SDC moves through the world. Various priors in the global frame (e.g. elevation tiles, road graph) may undergo an accurate global-to-smooth transform. Dynamic objects may be represented using a flow field in combination with an occupancy map to perform additional recurrent aggregation.

Multi-scale BEV space 230 can be four-dimensional, with three spatial dimensions (voxel space) and a time dimension. Each element of multi-scale BEV space 230 can include a voxel, a time associated with that voxel, and a combined feature vector obtained by combining (e.g., concatenating) feature vectors output by various feature networks 212-218. Features of multi-scale BEV space 230 can be processed by a BEV backbone 240, which can include any suitable number of neuron layers, e.g., layers implementing 3D convolutions in a ResNet-type architecture. Multiple resolutions of multi-scale BEV space 230 can be handled in different ways, depending on a specific implementation. One approach can include cutting out, from the coarser scales, the voxel volume used by finer scales, so that one scale is used for various detection, occupancy, semantics and other tasks. Such an approach can deploy special handling of voxels that are located in the vicinity of boundaries between different scales. For example, pixel intensities of boundary pixels (corresponding to one or both scales being matched) can be adjusted (blended) to ensure a smooth transition Another option is to use individual scales for various task, e.g., object detection, separately, then deploy a non-maximum suppression (NMS) algorithm over detections (e.g., bounding boxes, confidence scores, etc.) independently generated using multiple scales. Additionally, various classifier heads (e.g., semantics head 248) can be trained using images of multiple scales, when available. Yet another option can include enforcing sparsity in feature layers, implementing a threshold on a magnitude, and performing a sparse aggregation into a global voxel grid. Subsequent tasks can then use this sparse grid for inferences.

The output of BEV Backbone 240 can then be processed by final classifiers (heads) 242-252. Some of the classifier heads can be independent of other heads while some heads can be interdependent, e.g., as illustrated with arrows connecting a segmentation head 244, an occupancy head 246, and a semantics head 248. Flow head 242 can output any suitable representation of motion of objects that corresponds to various voxels of space, e.g., using motion vectors or the like.

Segmentation head 244 can perform object detection and instance segmentation. Various approaches can be used that aggregate instances both over space and time such that a single detection or instance is a set of voxels $x_i$, $y_i$, $z_i$, $t_i$. In some implementations, a detection box approach can be used. More specifically, similarly to the PointLens architecture, segmentation head 244 can produce parameters for each box densely and then perform NMS or weighted aggregation to produce discrete detections. Each voxel can predict an existence probability, a center offset (dx, dy), a box extent (w, l), and a heading (which can be $\sin \theta$, $\cos \theta$). Although the detection box approach may not naturally allow the network to produce convex hulls (e.g., minimal convex polygons encompassing pixels or voxels associated with individual objects), it is possible to use a Star-Poly type approach as an extension to accomplish this.

In some implementations, an instance segmentation approach can be used. In this approach, the network outputs dense per-instance occupancy. Such an approach allows for convex hulls or even more general representations of object boundaries, which can be advantageous for articulated vehicles. More specifically, the segmentation approach can include the following operations: (i) produce a 'centerness' output trained using a Gaussian that is centered close to the centroid of each object, (ii) produce an object center flow for each voxel within the object's bounds (dx, dy), (iii) find peaks in the centerness output using NMS, and (iv) associate voxels with each center using the center offset output masked using the occupancy map. Additional attributes can be aggregated using extra semantic heads and the voxel association.

In some implementations, a signed distance field can be used, e.g., a function defined as a distance to the boundary of an object with one sign (e.g., positive) of the function corresponding to the inside of the object, and opposite sign (e.g., negative) of the function corresponding tot eh outside of the object, and null values associated with the boundary. In this approach, the network can be trained to output a signed distance field representation. The network can then find zero crossings of this field plus containment to identify individual object instances, e.g., using a union-find algorithm. In some implementations, one or more of the described approaches can be combined.

Occupancy head 246 determines whether voxels are occupied by an object. More specifically, the occupancy map gives a probability that a voxel location is inside an obstacle, e.g., similar to the probability-of-existence. The probability map can be used as a precursor data product to perform instance segmentation and other semantic inference tasks within the network.

Semantics head 248 can be used to generate intent/semantics signals, including but not limited to such attributes as state of a motion of an object, human poses, cyclist hand gestures, and the like. Various approaches to semantics tasks can be used depending on their quality bar. In one approach, a dense voxelized semantic layer can be deployed that uses the instance mask to look up and aggregate semantic signals. In another approach, a recurrent neural network (RCNN) can be deployed that uses instance location and extents to crop relevant features using region of interest (ROI) pooling from individual sensor backbones. This second approach can be advantageous for quality-critical tasks.

Occlusion head 250 can output probability of existence, e.g., a probability that an agent is at a particular location, a probability of visibility, e.g., a probability that the agent would be perceived given the agent's presence, as well as various object attributes that can be conditioned on the actual agent being at that location. In some implementations, losses would be weighted using a probability-of-visibility mask so as to not encourage the network to presciently guess properties about objects that the network should not be able to see.

Roadgraph head 252 can output reconstructed roadgraph in the vicinity of the vehicle based on voxel occupancy, flow of the motion of detected and classified objects, available map data, etc. The output can be in a vectorized format (e.g., lanes represented as polylines) or a heat map format. In some implementations, roadgraph head 252 outputs association of various driving lanes to detected lights indicating whether the traffic is allowed to move in a particular lane. For example, a set of lights at an intersection can indicate that the rightmost lane has currently a green light that allows the right turn, two middle lines have red lights forbidding proceeding through the intersection in the forward direction, and the leftmost lane has a blinking yellow arrow indicating that the left turn is allowed provided that there is no oncoming traffic. EEPM 132 can determine, and output by roadgraph head 252, that the side of the street where the vehicle is located has four lanes and can further determine that the set of lights has four lights. The output of roadgraph head 252 can include identification of the current statuses of each of the set of street traffic lights and the associations of each of the street lights with the respective traffic lanes. Additionally, output of roadgraph head 252 can include location of stop lines at the intersection.

The architecture of EEPM 132, as illustrated in FIG. 2, can vary depending on a specific task and the level of driving automation that is to be achieved. In some implementations, e.g., related to L2 and L3 driver assistance systems, some of the sensing modalities and classification heads can be omitted. For example, in cost-sensitive applications, lidar data 204 and lidar feature network 214 can be absent. In some implementations, e.g., L2 applications, EEPM architecture can include camera feature network 212, multi-scale BEV space 230 (which can be for a single camera or multiple cameras), BEV backbone 240, roadgraph head 252 to output local lane mapping, occupancy head 246 and semantics head 248. In some implementations, occupancy head 246 and semantics head 248 can be combined into a single detection head (not explicitly shown in FIG. 2) that classifies boxes of voxels (rather than per-voxel classification) and determines the types of detected objects, e.g., vehicles, pedestrians, motorcyclists, etc. In some implementations, e.g., L3 applications (or even L2 applications), EEPM architecture can further include radar feature network 216.

In some implementations, the type of the object does not have to be determined and it can be sufficient to identify an occupancy grid (occupied and unoccupied voxels) and the flow (motion of the voxels) can be sufficient. For example, in highway driving use cases, identification of the type of an object can be less important than the fact that some object occupies a particular region of space (as all or most objects on the highways are vehicles). In urban driving use cases, identification of a type of an object can be more important as a much greater variety of road user a can be present (e.g., pedestrians, electric scooters, bicyclists, dogs, etc.) each with a specific type of motion behavior (e.g., a pedestrian can be moving across a roadway).

Output of EEPM 132 can be used for tracking of detected objects. In some implementations, tracking-by-detection or instance segmentation can be used instead of building an explicit tracker. An interface of behavior prediction module (BPM) 134 can include, for each object, a history of recent object locations, extents, headings and velocities. For additional accuracy of prediction, per-voxel flow information can include not only velocities but also kinematic attributes, such as curvature, yaw rate, and the like. Based on this data, BPM 134 can predict future trajectories in a way that is advantageous over a more traditional tracking approach. In some implementations, more accurate tracking of objects may be performed using a Kalman filter (or a similar statistical filter) that accounts for a difference between measured coordinates of objects and actual coordinates. In some implementations, an alternative approach can be used that deploys a recurrent neural network (RNN) to smooth and interpolate locations and velocities over time, similarly to how a Kalman filter does.

Output of EEPM 132 can be used for vehicle localization. In some implementations, BPM 134 can use lidar-based global mapping that maps an entire region of 3D environment around the vehicle. In some implementations, BPM 134 can deploy a simpler system that uses accelerometry, odometry, GNNS data, as well as camera-based lane mapping to identify the current position of the vehicle relative to the map data.

In different implementations, BPM 134 can have different levels of sophistication depending on the specific operations design domain (ODD) of interest (e.g., highway driving, urban driving, suburban driving, etc.). In L2 driving assistance implementations ("hands on the wheel"), where the driver is expected at any time to take over the vehicle's control, BPM 134 can have a minimum functionality and be able to predict behavior of other road users within a short time horizon, e.g., several seconds. For example, such predictions can include impeding lane changes by other vehicles ("agents"). BPM 134 can use various cues, such as a turning signal, front wheel turning, a driver turning the head in the direction of a turn, and the like. BPM 134 can determine if such impending lane changes require driver's attention. In the instances where a lane changing agent is sufficiently far from the vehicle, AVCS 140 acting on BPM 134 prediction can change the vehicle's trajectory (e.g., slow the vehicle down) without driver's involvement. In the instances where a change requires immediate driver's attention, BPM 134 can output a signal to the driver indicating that the driver should take over controls of the vehicle.

In L3 driving assistance implementations ("hands off the wheel"), the objective can be to provide an autonomous driving function for at least a certain time horizon (e.g., X seconds), such that if a condition arises that requires the driver's control, this condition will be predicted at least X seconds prior to its occurrence. The map data can further include camera and/or radar images of prominent landmarks (bridges, signs, roadside structures, etc.). In some implementations, BPM 134 of L3 systems may at any given time output two trajectories, Option A and a backup Option B, for X seconds. For example, when traveling on a city street in the rightmost lane of the street, BPM 134 can compute Option A for the vehicle to remain in the rightmost lane and can further compute Option B for the vehicle to move over to the left lane if a parked vehicle veers into the leftmost lane. BPM 134 can predict that within X seconds into the future the left lane is to remain available and continue vehicle operations. At some point, BPM 134 can predict that the left lane has a fast moving agent that is to move close enough to the vehicle to make the left lane (and thus Option B) unavailable to the vehicle. Having determined that Option B is likely to become unavailable, BPM 134 can call the driver to take control of the vehicle. In yet even more sophisticated systems, where driver's input is not expected (e.g., autonomous L4 driving systems), if Option B disappears, AVCS 140 can stop the vehicle on the side of the road until the driving situation changes favorably.

To achieve reliable predictions, BPM 134 can simulate multiple possible scenarios how different road users can behave in different ways and estimate the probability of various such scenarios and the corresponding outcomes. In particular, BPM 134 can use a closed-loop approach and determine a distribution of probabilities that, if the vehicle makes a certain driving path change (or maintains the current driving path), other vehicles are to respond in a certain way, e.g., to yield to the vehicle or to accelerate or otherwise block the vehicle's driving path. BPM 134 can evaluate multiple such scenarios and output probabilities for each or at least some of the scenarios. In some implementations, BPM 134 can use an open-loop approach, in which predictions are made based on the current state of motion of the agents and the changes of the motion of the vehicle do not affect the behavior of other agents. In some implementations, predicted locations of various agents can be represented via future occupancy heat maps.

Figure 3A:
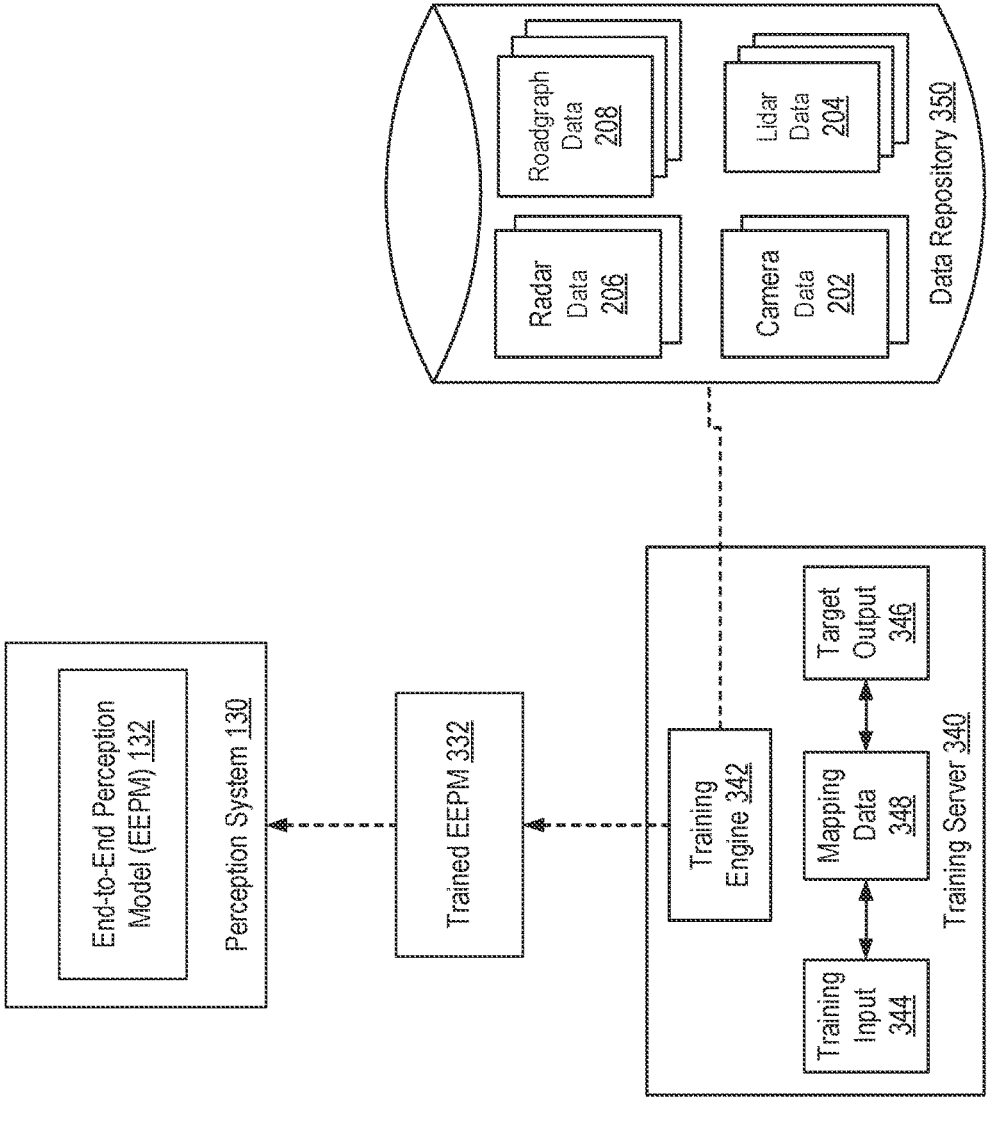
FIG. 3A is a diagram illustrating example training architecture for training of an end-to-end prediction model as part of a perception system of a vehicle, in accordance with some implementations of the present disclosure.

FIG. 3A is a diagram illustrating example training architecture 300 for training of an end-to-end prediction model as part of a perception system of a vehicle, in accordance with some implementations of the present disclosure. EEPM 132 can be trained using actual sensing images (e.g., lidar, radar, camera, roadgraph data, etc.) and other data that have been recorded during driving missions and annotated with ground truth, which can include correct identification of locations and type of objects in the environment, current state of motion of the objects, future state of motion of the objects (e.g., lane changes, stops, accelerations, etc.). Training images can include images obtained by the sensors of the specific modalities that are to be deployed on a particular autonomous driving or driver-assistance platform. For example, a particular EEPM 132 that is intended to be used with lidar data, optical range camera data, and IR camera data can be trained with the corresponding sets of training data obtained with lidars, optical range cameras, and IR cameras. During training of a different EEPM 132 that is to be used with radar data in place of lidar data, the lidar training images can be replaced with radar training images. In some implementations, training of EEPM 132 can be performed using modalities that are not to be used in actual vehicles. For example, training of EEPM 132 can be performed with camera, radar and lidar images, whereas the trained EEPM 132 can be subsequently used with camera and radar images.

Training can be performed by a training engine 342 hosted by a training server 340, which can be an outside server that deploys one or more processing devices, e.g., central processing units (CPUs), GPUs, TPUs, etc. In some implementations, one or more models of EEPM 132 can be trained by training engine 342, stored (e.g., as trained EEPM 332) on any suitable storage medium, and subsequently downloaded onto the perception system 130 of the vehicle 100. EEPM 132, as illustrated in FIG. 3A, can be trained using training data that includes training inputs 344 and corresponding target outputs 346 (correct matches for the respective training inputs). During training of EEPM 132, training engine 342 can find patterns in the training data that map each training input 344 to the target output 346.

Training engine 342 can have access to a data repository 350 storing multiple instances of camera data 202, lidar data 204, radar data 206, roadgraph data 208, and the like, obtained during driving situations in a variety of driving environments (e.g., urban driving missions, highway driving missions, rural driving missions, etc.). Data, e.g., lidar data, can include images and/or any other data, e.g., voxel intensity, velocity data associated with voxels, as well as metadata, such as timestamps. Roadgraph data can include any two-dimensional maps of the roadway and its surrounding, three-dimensional maps (including any suitable mapping of stationary objects, e.g., identification of bounding boxes of such objects). During training, training engine 342 can select (e.g., randomly), as training data, any number of sets of data (e.g., lidar data, camera data, radar data, roadgraph data, etc.). Training data can be annotated with correct object identifications. In some implementations, annotations can be made by a developer before the annotated training data is placed into data repository 350. Annotated training data retrieved by training server 340 from data repository 350 can include one or more training inputs 344 and one or more target outputs 346. Training data can also include mapping data 348 that maps training inputs 344 to target outputs 346. For example, mapping data 348 can identify a radar blob as a vehicle in radar image. The mapping data 348 can include an identifier of the training data, locations of the objects in the corresponding image, size of the objects, speed and direction of motion of the objects, class (type) of the objects, and other suitable information. In some implementations, training can be performed using mapping data that is unannotated. For example, training inputs can include a time series of sensing frames that include depictions of objects (e.g., pedestrians, animals) that initially remain outside the roadway but subsequently move onto the roadway. By discovering patterns in the appearance of objects, EEPM 132 can learn to identify objects of suitable size that are likely to remain on the roadway (e.g., vehicles), objects that are movable and can be both on the roadway and outside it (e.g., pedestrians, animals), and objects that are not likely to be on the roadway (e.g., outside structures, road signs, etc.).

During training of EEPM 132, training engine 342 can change parameters (e.g., weights and biases) of various models of EEPM 132 until the models successfully learn how to identify and classify target outputs 346, e.g., various objects in the outside environment. In some implementations, different models (subnetworks) of EEPM 132 (as described above in conjunction with FIG. 2) can be trained separately. In some implementations, various models (subnetworks) of EEPM 132 can be trained together (e.g., concurrently). Different models can have different architectures (e.g., different numbers of neuron layers and different topologies of neural connections) and can have different settings (e.g., activation functions, etc.). Various training inputs 344 are potentially noisy and subject to failure. To enforce robustness individual sensors and entire sensing modalities can be randomly dropped out during training. This forces EEPM 132 to be robust against individual failures and develops modality complementarity.

The data repository 350 can be a persistent storage capable of storing data, as well as data structures configured to detect and classify objects and predict behavior of detected. The data repository 350 can be hosted by one or more storage devices, such as main memory, magnetic or optical storage disks, tapes, or hard drives, network-attached storage (NAS), storage area network (SAN), and so forth. Although depicted as separate from training server 340, in an implementation, the data repository 350 can be a part of training server 340. In some implementations, data repository 350 can be a network-attached file server, while in other implementations, data repository 350 can be some other type of persistent storage such as an object-oriented database, a relational database, and so forth, that can be hosted by a server machine or one or more different machines accessible to the training server 340 via a network (not shown in FIG. 3A).

Figure 3B:
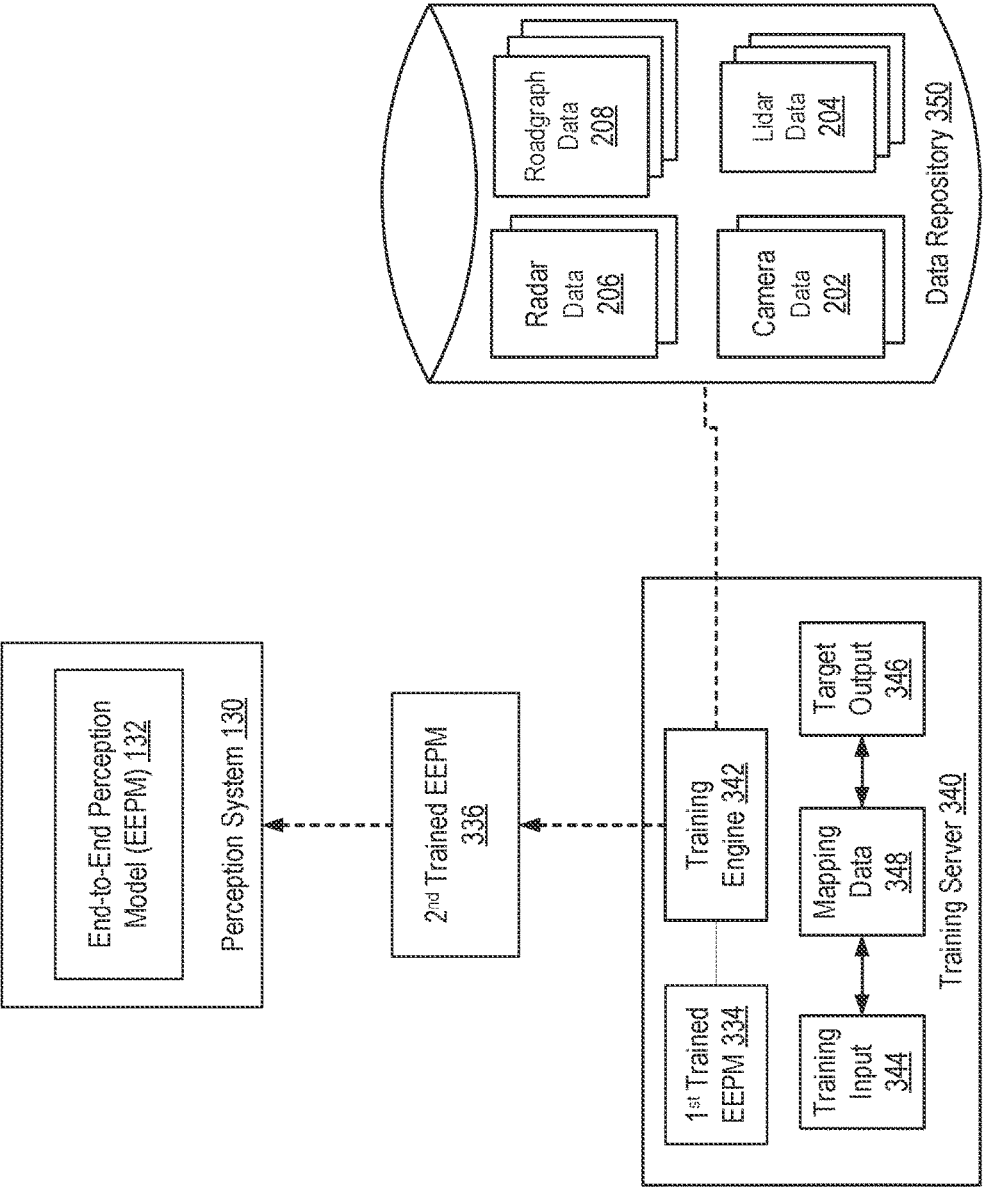
FIG. 3B is a diagram illustrating another example training architecture for training of an end-to-end model as part of a perception system of a vehicle, in accordance with some implementations of the present disclosure.

FIG. 3B is a diagram illustrating another example training architecture 301 for training of an end-to-end model as part of a perception system of a vehicle, in accordance with some implementations of the present disclosure. In some implementations, as depicted in FIG. 3B, training of EEPM 132 can be a two-stage process. Initially, a first EEPM model 334 (a teacher model) can be trained. First trained EEPM model 334 can be a high-performance model capable of supporting autonomous driving functionality, e.g., L4 or L5 systems. First trained EEPM model 334 can be trained using human developer input (e.g., annotations and other mapping data 348). Output of first trained EEPM 334 can then be used as a ground truth for training additional EEPM models, e.g., a second EEPM 336 (a student model). Second trained EEPM 336 can be a reduced-functionality EEPM to be used in driver assistance systems, e.g., L2 and/or L3 systems. For example, whereas the first trained EEPM 334 can support autonomous urban driving, including intersection driving, the second trained EEPM 336 can be capable of supporting suburban driving and identifying road intersections. Upon identification of an upcoming intersection within a target time, the second trained EEPM 336 can warn the driver to take over the vehicle's controls. After training by training engine 342, the second trained EEPM 332336 can be stored on any suitable storage medium and subsequently downloaded onto the perception system 130 of the vehicle 100.

FIG. 4 illustrates an example method 400 of end-to-end processing that uses multiscale representations of an environment of a vehicle for efficient detection of objects, in accordance with some implementations of the present disclosure. A processing device, having one or more processing units (CPUs) and memory devices communicatively coupled to the CPU(s), can perform method 400 and/or each of its individual functions, routines, subroutines, or operations. The processing device executing method 400 can perform instructions issued by various components of the sensing system 110 or data processing system 120 of FIG. 1, e.g., EEPM 132 and/or BPM 134. In some implementations, method 400 can be directed to systems and components of an autonomous driving vehicle, such as the autonomous vehicle 100 of FIG. 1. Method 400 can be used to improve performance of the processing system 120 and/or the autonomous vehicle control system 140. In certain implementations, a single processing thread can perform method 400. Alternatively, two or more processing threads can perform method 400, each thread executing one or more individual functions, routines, subroutines, or operations of the methods. In an illustrative example, the processing threads implementing method 400 can be synchronized (e.g., using semaphores, critical sections, and/or other thread synchronization mechanisms). Alternatively, the processing threads implementing method 400 can be executed asynchronously with respect to each other. Various operations of method 400 can be performed in a different order compared with the order shown in FIG. 4. Some operations of method 400 can be performed concurrently with other operations. Some operations can be optional. Method 400 can use real-time images obtained by one or more cameras of a vehicle, or by cameras mounted on any other suitable application platform. Cameras can be optical range cameras and/or IR cameras, including panoramic (surround-view) cameras, partially panoramic cameras, high-definition (high-resolution) cameras, close-view cameras, cameras having a fixed field of view (relative to the vehicle), cameras having a dynamic (adjustable) field of view, cameras having a fixed or adjustable focal distance, cameras having a fixed or adjustable numerical aperture, and any other suitable cameras. Optical range cameras can further include night-vision cameras. Images acquired by cameras can include various metadata that provides geometric associations between image pixels and spatial locations of objects, correspondence between pixels of different images, and the like. In some implementations, method 400 can be performed by a perception system of an autonomous vehicle, a vehicle that deploys driver assistance technology, or a part of any other application platform that uses object detection and classification.

At block 410, method 400 can include a processing device obtaining an input data (e.g., input data 201 in FIG. 2) characterizing an environment of a vehicle. The input data can include a lidar sensing data, a radar sensing data, or a camera sensing data. In some implementations, the input data can include roadgraph data that maps a drivable portion of the environment of the vehicle. In some implementations, the input data can include a three-dimensional (3D) set of voxels, with each voxel of at least a subset of the 3D set of voxels including a distance to a portion of the environment represented by a respective voxel. As illustrated with the callout portion of FIG. 2, obtaining the input data can include, at block 412, preprocessing the camera sensing data using a lifting transform. The lifting transform can convert a two-dimensional (2D) set of pixels into the 3D set of voxels. In some implementations, the 3D set of voxels can include a first portion of voxels having a first spatial resolution and depicting a first region of the environment. The 3D set of voxels can include a second (and any additional) portion of voxels having a second (and any additional) spatial resolution and depicting a second region of the environment. The 3D set of voxels can further include a third portion of voxels associated with a boundary between the first region and the second region. The third portion can include voxels interpolated (e.g., blended) between voxels of the first portion and voxels of the second portion.

At block 420, method 400 may continue with the processing device processing the input data using a first set of neural network layers to obtain a first set of features for a first region of the environment (e.g., camera features output by camera feature network 212, lidar features output by lidar feature network 214, radar features output by radar feature network 216, and/or roadgraph features output by roadgraph feature network 218). The first set of features can be associated with a first spatial resolution. Processing the input data using the first set of neural network layers can further output a second set of features for at least a second region of the environment. The second set of features is associated with a second spatial resolution. In some implementations, the second set of features can be for both the first region and the second region.

At block 430, method 400 can continue with the processing device processing the first set of features and the second set of features (e.g., concatenated into a single feature vector) using a second set of neural network layers to identify one or more objects in the environment of the vehicle. In some implementations, the second set of neural network layers can include a common backbone and a plurality of classifier heads receiving inputs generated by the common backbone. The classifier heads can include one or more of a segmentation head, an occupancy head, a traffic flow head, an object occlusion head, a roadgraph head, a semantics head, and/or the like. In some implementations, In some implementations, at block 440, an output of processing of the first set of features and the second set of features can be used to update the roadgraph data with a current state of the drivable portion of the environment of the vehicle. The current state of the drivable portion of the environment of the vehicle can include a status of one or more traffic lights in the environment of the vehicle.

In some implementations, at block 450, the output of processing of the first set of features and the second set of features can be further used to identify a state of motion of a first (second, third, etc.) object of the one or more objects. In some implementations, the state of motion of the first (second, third, etc.) object can be identified for a plurality of times. Correspondingly, at block 460, method 400 can include predicting, using at least the state of motion of the first (second, third, etc.) object for the plurality of times, a trajectory of the first (second, third, etc.). At block 470, method 400 can include causing a driving path of the vehicle to be modified in view of the identified one or more objects.

FIG. 5 depicts a block diagram of an example computer device 500 capable of enabling end-to-end perception models that can be deployed as part of a perception system of a vehicle, in accordance with some implementations of the present disclosure. Example computer device 500 can be connected to other computer devices in a LAN, an intranet, an extranet, and/or the Internet. Computer device 500 can operate in the capacity of a server in a client-server network environment. Computer device 500 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 500 can include a processing device 502 (also referred to as a processor or CPU), a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a secondary memory (e.g., a data storage device 518), which can communicate with each other via a bus 530.

Processing device 502 (which can include processing logic 503) represents one or more general-purpose processing devices such as a microprocessor, central processing unit, or the like. More particularly, processing device 502 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. In accordance with one or more aspects of the present disclosure, processing device 502 can be configured to execute instructions performing method 400 of end-to-end processing that uses multiscale representations of an environment of a vehicle for efficient detection of objects.

Example computer device 500 can further comprise a network interface device 508, which can be communicatively coupled to a network 520. Example computer device 500 can further comprise a video display 510 (e.g., a liquid crystal display (LCD), a touch screen, or a cathode ray tube (CRT)), an alphanumeric input device 512 (e.g., a keyboard), a cursor control device 514 (e.g., a mouse), and an acoustic signal generation device 516 (e.g., a speaker).

Data storage device 518 can include a computer-readable storage medium (or, more specifically, a non-transitory computer-readable storage medium) 528 on which is stored one or more sets of executable instructions 522. In accordance with one or more aspects of the present disclosure, executable instructions 522 can comprise executable instructions performing methods and techniques of the instant disclosure.

Executable instructions 522 can also reside, completely or at least partially, within main memory 504 and/or within processing device 502 during execution thereof by example computer device 500, main memory 504 and processing device 502 also constituting computer-readable storage media. Executable instructions 522 can further be transmitted or received over a network via network interface device 508.

While the computer-readable storage medium 528 is shown in FIG. 5 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising:
obtaining, by a processing device, an input data characterizing an environment of a vehicle, wherein the input data comprises at least lidar sensing data and camera sensing data; and
inputting, by the processing device, the lidar sensing data into a lidar neural network (NN) that generates:
a first set of lidar feature vectors respectively associated with a first plurality of pixels of a first pixel size, and
a second set of lidar feature vectors respectively associated with a second plurality of pixels of a second pixel size, the second pixel size being less than the first pixel size;
inputting, by the processing device, the camera sensing data into a camera NN that generates:
a first set of camera feature vectors respectively associated with the first plurality of pixels of the first pixel size, and a second set of camera feature vectors respectively associated with the second plurality of pixels of the second pixel size:
aggregating at least the first set of camera feature vectors and the first set of lidar feature vectors to obtain a first set of aggregated feature vectors associated with the first pixel size;
aggregating at least the second set of camera feature vectors and the second set of lidar feature vectors to obtain a second set of aggregated feature vectors associated with the second pixel size;
processing, by the processing device, the first set of aggregated feature vectors and the second set of aggregated feature vectors to generate:
a first set of object detections associated with the first pixel size, and
a second set of object detections associated with the second pixel size;
identifying one or more objects in the environment of the vehicle based at least on aggregation of the first set of object detections and the second set of object detections; and
controlling a driving path of the vehicle in view of the one or more identified objects.

2. The method of claim 1, wherein the first plurality of pixels and the second plurality of pixels are associated with a bird's eye view (BEV) coordinate system, and wherein the first set of camera feature vectors and the second set of camera feature vectors are generated using a lifting transform to the BEV from a perspective view associated with the camera sensing data.

3. The method of claim 1, wherein the input data further comprises radar sensing data, the method further comprising:
inputting, by the processing device, the radar sensing data into a radar NN that generates:
a first set of radar feature vectors respectively associated with the first plurality of pixels of the first pixel size, and
a second set of radar feature vectors respectively associated with the second plurality of pixels of the second pixel size;
wherein the first set of aggregated feature vectors is obtained by further aggregating the first set of radar feature vectors, and wherein the second set of aggregated feature vectors is obtained by further aggregating the second set of radar feature vectors.

4. The method of claim 1, wherein the first plurality of pixels of
the first pixel size depicts a first region of the environment, and
wherein the second plurality of pixels of the second pixel size depicts a second region of the environment, wherein the second region is smaller than the first region.

5. The method of claim 1, wherein the input data further comprises roadgraph data that maps a drivable portion of the environment of the vehicle, the method further comprising:
inputting, by the processing device, the roadgraph data into a roadgraph NN that generates:
a first set of roadgraph feature vectors respectively associated with the first plurality of pixels of the first pixel size, and
a second set of roadgraph feature vectors respectively associated with the second plurality of pixels of the second pixel size;

wherein the first set of aggregated feature vectors is obtained by further aggregating the first set of roadgraph feature vectors, and wherein the second set of aggregated feature vectors is obtained by further aggregating the second set of roadgraph feature vectors, and wherein processing the first set of aggregated feature vectors and the second set of aggregated feature vectors is further to generate a current state of the drivable portion of the environment of the vehicle.

6. The method of claim 5, wherein the current state of the drivable portion of the environment of the vehicle comprises a status of one or more traffic lights in the environment of the vehicle.

7. The method of claim 1, wherein the first set of aggregated feature vectors and the second set of aggregated feature vectors are processed using a common backbone and a plurality of classifier heads receiving inputs generated by the common backbone, wherein the plurality of classifier heads comprises one or more of:
 a segmentation head,
 an occupancy head,
 a traffic flow head,
 an object occlusion head, or
 a roadgraph head.

8. The method of claim 1, wherein processing the first set of aggregated feature vectors and the second set of aggregated feature vectors is further to generate:
 a state of motion of a first object of the one or more objects.

9. The method of claim 8, wherein the state of motion of the first object is identified for a plurality of times, the method further comprising:
 predicting, using at least the state of motion of the first object for the plurality of times, a trajectory of the first object.

10. The method of claim 1, wherein the first set of aggregated feature vectors comprises a first subset of aggregated feature vectors associated with a first time and a second subset of aggregated feature vectors associated with a second time, and wherein processing the first set of aggregated feature vectors and the second set of aggregated feature vectors comprises:
 performing spatial warping of the first subset of aggregated feature vectors from the first time to the second time; and
 aggregating the first subset of aggregated feature vectors, spatially warped, with the second subset of aggregated feature vectors.

11. The method of claim 1, wherein the aggregation of the first set of object detections and the second set of object detections comprises using non-maximum suppression (NMS).

12. A system comprising:
 a sensing system of a vehicle, the sensing system configured to:
  obtain an input data characterizing an environment of the vehicle, wherein the input data comprises at least lidar sensing data and camera sensing data; and
 a perception system of the vehicle, the perception system configured to:
  input the lidar sensing data into a lidar neural network (NN) that generates:
   a first set of lidar feature vectors respectively associated with a first plurality of pixels of a first pixel size, and

a second set of lidar feature vectors respectively associated with a second plurality of pixels of a second pixel size, the second pixel size being less than the first pixel size;
  input the camera sensing data into a camera NN that generates:
   a first set of camera feature vectors respectively associated with the first plurality of pixels of the first pixel size, and
   a second set of camera feature vectors respectively associated with the second plurality of pixels of the second pixel size;
  aggregate at least the first set of camera feature vectors and the first set of lidar feature vectors to obtain a first set of aggregated feature vectors associated with the first pixel size;
  aggregate at least the second set of camera feature vectors and the second set of lidar feature vectors to obtain a second set of aggregated feature vectors associated with the second pixel size;
  process the first set of aggregated feature vectors and the second set of aggregated feature vectors to generate:
   a first set of object detections associated with the first pixel size, and
   a second set of object detections associated with the second pixel size;
  identify one or more objects in the environment of the vehicle based at least on aggregation of the first set of object detections and the second set of object detections; and
  control a driving path of the vehicle in view of the one or more identified objects.

13. The system of claim 12, wherein the first plurality of pixels and the second plurality of pixels are associated with a bird's eye view (BEV) coordinate system, and wherein the first set of camera feature vectors and the second set of camera feature vectors are generated using a lifting transform to the BEV from a perspective view associated with the camera sensing data.

14. The system of claim 13, wherein the input data further comprises radar sensing data, and wherein the perception system is further configured to:
 input the radar sensing data into a radar NN that generates:
  a first set of radar feature vectors respectively associated with the first plurality of pixels of the first pixel size, and
  a second set of radar feature vectors respectively associated with the second plurality of pixels of the second pixel size;
 wherein the first set of aggregated feature vectors is obtained by further aggregating the first set of radar feature vectors, and wherein the second set of aggregated feature vectors is obtained by further aggregating the second set of radar feature vectors.

15. The system of claim 12, wherein the input data further comprises roadgraph data that maps a drivable portion of the environment of the vehicle, wherein the perception system is further configured to:
 input the roadgraph data into a roadgraph NN that generates:
  a first set of roadgraph feature vectors respectively associated with the first plurality of pixels of the first pixel size, and a second set of roadgraph feature vectors respectively associated with the second plurality of pixels of the second pixel size;

wherein the first set of aggregated feature vectors is obtained by further aggregating the first set of roadgraph feature vectors, and wherein the second set of aggregated feature vectors is obtained by further aggregating the second set of roadgraph feature vectors, and wherein to process the first set of aggregated feature vectors and the second set of aggregated feature vectors, the perception system is further configured to generate a current state of the drivable portion of the environment of the vehicle.

16. The system of claim 15, wherein the current state of the drivable portion of the environment of the vehicle comprises a status of one or more traffic lights in the environment of the vehicle.

17. The system of claim 12, wherein the first set of aggregated feature vectors and the second set of aggregated feature vectors are processed using a common backbone and a plurality of classifier heads receiving inputs generated by the common backbone, wherein the plurality of classifier heads comprises one or more of:

a segmentation head, an occupancy head, a traffic flow head, an object occlusion head, or a roadgraph head.

18. The system of claim 12, wherein to process the first set of aggregated feature vectors and the second set of aggregated feature vectors, the perception system is further to identify a state of motion of a first object of the one or more objects for a plurality of times, and wherein the perception system is further to:

predict, using at least the state of motion of the first object for the plurality of times, a trajectory of the first object.

19. The system of claim 12, wherein the aggregation of the first set of object detections and the second set of object detections comprises using non-maximum suppression (NMS).

20. A non-transitory computer-readable storage medium storing instructions that, when executed by a processing device, cause the processing device to:

obtain an input data characterizing an environment of a vehicle, wherein the input data comprises at least lidar sensing data and camera sensing data; and input the lidar sensing data into a lidar neural network (NN) that generates:

a first set of lidar feature vectors respectively associated with a first plurality of pixels of a first pixel size, and a second set of lidar feature vectors respectively associated with a second plurality of pixels of a second pixel size, the second pixel size being less than the first pixel size;

input the camera sensing data into a camera NN that generates:

a first set of camera feature vectors respectively associated with the first plurality of pixels of the first pixel size, and a second set of camera feature vectors respectively associated with the second plurality of pixels of the second pixel size;

aggregate at least the first set of camera feature vectors and the first set of lidar feature vectors to obtain a first set of aggregated feature vectors associated with the first pixel size;

aggregate at least the second set of camera feature vectors and the second set of lidar feature vectors to obtain a second set of aggregated feature vectors associated with the second pixel size:

process the first set of aggregated feature vectors and the second set of aggregated feature vectors to generate:

a first set of object detections associated with the first pixel size, and a second set of object detections associated with the second pixel size;

identify one or more objects in the environment of the vehicle based at least on aggregation of the first set of object detections and the second set of object detections; and control a driving path of the vehicle in view of the one or more identified objects.

* * * * *